Patented May 7, 1946

2,399,626

UNITED STATES PATENT OFFICE 2,399,626

POLYMERS

Donald Drake Coffman, Lindamere, Del., assignor to E. I. du Pont de Nemours & Company, Wilmington, Del., a corporation of Delaware No Drawing. Original application December 12, 1942, Serial No. 468,811. Divided and this application November 9, 1945, Serial No. 627,793

15 Claims. (Cl. 260—86)

This invention relates to polymers and copolymers of esters of ethenyloxyacetic acid, $$CH_2=CHOCH_2CO_2H$$

This invention has as an object the preparation of polymers, including copolymers, of esters of ethenyloxyacetic acid. Another object comprises the polymeric esters thus produced. Other objects will appear hereinafter.

These objects are accomplished by the following invention of polymers, including copolymers, of ethenyloxyacetic acid esters and processes for preparing said polymers.

The ethenyloxyacetic acid esters can be prepared by pyrolyzing over a silver-on-asbestos catalyst at 250°–350° C. the corresponding bis-(hydroxyacetic acid ester) acetals which are conveniently prepared by reacting hydroxyacetic acid ester with acetylene under atmospheric pressure and at 25°–50° C. in the presence of mercuric oxide and a boron trifluoride-methanol complex as catalyst. The acetal on pyrolysis splits into an ethenyloxyacetic acid ester and an hydroxyacetic acid ester. The condensate on pyrolysis consists of a mixture of the unpyrolyzed acetal, the hydroxyacetic acid ester, and the ethenyloxyacetic acid ester. The ethenyloxyacetic acid ester and the hydroxyacetic acid ester are separated from the acetal by fractional distillation, and the pure ethenyloxyacetic acid ester is separated from the hydroxyacetic acid ester. In some cases this is most conveniently done by aqueous extraction.

The ethenyloxyacetic acid esters are polymerized alone or in conjunction with other polymerizable ethylenic compounds, such as propylene, isobutylene, and vinyl isobutyl ether, by treating a solution of the monomers, preferably in a solvent for both the monomers and the polymers, under a nitrogen atmosphere with a metal halide type catalyst such as boron trifluoride, at temperatures below 0° C., preferably below —44° C. The products obtained range from low molecular weight polymers of molecular weight of about 500, to higher molecular weight polymers in the range of 20,000–30,000, the higher molecular weight polymers being rubbery in character.

Copolymerization of the ethenyloxyacetic acid esters with methacrylic-type esters can be effected by employing the granulation polymerization technique. This is carried out in a system comprising a low proportion of the ethenyloxyacetic acid ester and the methacrylic-type ester, a catalyst such as benzoyl peroxide, a granulating agent such as the sodium salt of polymethacrylic acid, a buffering agent such as disodium hydrogen phosphate, and water. This mixture is agitated vigorously and heated, e. g., at 120°–125° C. for several hours until polymerization is essentially complete. It is then allowed to cool while continuing the agitation. The copolymer which separates in fine white granules upon stopping the agitation is filtered and washed. The copolymer obtained can be molded to clear, colorless objects which, under the preferred circumstances, have increased softening points, improved stiffness, improved impact strength, and improved flexural strength over the unmodified control polymer. It is to be emphasized that in order to obtain improved properties only small proportions, ca. 0.1–10%, of the vinyl ether should be used.

The more detailed practice of the invention is illustrated by the following examples, wherein parts given are by weight. There are of course many forms of the invention other than these specific embodiments.

Example I

A vertical pyrolysis tube which can be heated to 250–350° C. is fitted with the following (1) an inlet tube for inert gases, (2) a calibrated liquid feed, (3) a preheater section which is equal in volume to the section containing the catalyst, is heated from 150° C. to 250° C. and is packed with suitable solid heat exchange material such as small pieces of glass tubing, (4) a catalyst section whose volume is large enough to contain one part of catalyst for each part of liquid feed per hour, (5) a suitable device for measuring the temperature of the preheater and catalyst bed sections, such as an internal thermocouple, (6) a suitable device for measuring the flow of gas, such as a calibrated orifice or a wet test meter, (7) a suitable cooling system for condensing the vapors from the pyrolysis tube.

The pyrolysis tube is packed in the following manner: The lower third of the column is filled with small pieces of glass tubing, the middle third of the column is packed with a mixture of 120 parts of a silver-on-asbestos catalyst prepared as described in U. S. Patent 1,931,858 and an equal volume of small pieces of glass tubing, and the upper third of the tube is packed with glass tubing as used in the other sections. Through the vertical axis of the tube extends a small glass tube containing a thermocouple which can be adjusted to various levels such that the temperatures of the upper third or preheater section, the middle third or catalyst bed, and the lower third or the tube can be measured. The upper third or the preheater section of the furnace is heated from 190° to 210° C. while the catalyst bed of the furnace is heated from 280° to 320° C. Nitrogen is passed through the pyrolysis tube at the rate of 42 parts per hour and bis-(methyl hydroxyacetate) acetal is introduced through the calibrated feed at the rate of 100 parts per hour. After 7.5 hours a condensate of 748 parts is obtained which has an index of refraction of $N_D^{25}$; 1.4222.

The condensate is fractionally distilled at 50 mm. mercury pressure, and the fraction distilling at 71.5–74° C. is collected. It consists of a mixture of methyl hydroxyacetate and methyl ethenyloxyacetate. This fraction comprising 482 parts, corresponds to a conversion of 67% of the acetal on pyrolysis. The distillation residue is fractionated at 2–3 mm., and 235 parts of bis-(methyl hydroxyacetate) acetal distilling at 114–117° C. is recovered.

The fraction boiling at 71.5–74° C. and consisting of methyl ethenyloxyacetate and methyl hydroxyacetate is dissolved in 400 parts of diethyl ether and washed five times with water, each wash being accomplished with 100 parts of water. After drying over anhydrous sodium sulfate, the ether is removed from the organic solution by distillation, and the residue is fractionally distilled at 48.5–50.5 mm. of mercury pressure. In this manner 200 parts of methyl ethenyloxyacetate is obtained boiling at 76.4–76.7° C. under this pressure. The ester has the following constants:

| Physical constants | Calculated | Found |
|---|---|---|
| Carbon_____per cent__ | 51.72 | 51.96 |
| Hydrogen_____do____ | 6.90 | 7.13 |
| Saponification equiv._____ | 116 | 115.8 |
| Index of refraction $n_D^{25}$_____ | | 1.4235 |
| Density, 25°_____ | | 1.0531 |
| Molecular refraction_____ | 28.11 | 28.06 |

Example II

A mixture of 1200 parts of water, 14 parts of dibasic sodium phosphate dodecahydrate, 120 parts of a 1% aqueous solution of the sodium salt of polymethacrylic acid as a granulating agent, 693 parts of methyl methacrylate, 7 parts of methyl ethenyloxyacetate, and 1.75 parts of benzoyl peroxide is charged into a glass-lined autoclave equipped with a stainless steel stirrer, thermocouple wells, and an outside pressure gauge. The autoclave is sealed and heated to 125° C. during 20 minutes. As the temperature approaches 125° C. the reaction occurs very readily and a pressure of 51 lb./sq. in. is developed. Polymerization appears to be nearly complete at the end of 2 minutes, but the temperature is maintained above 100° C. for an additional hour to insure completion of the reaction. On cooling the reaction mixture, the product appears as medium fine granules. The copolymer is filtered, washed, and dried to constant weight. In this manner there is obtained 613 parts of white granular copolymer of methyl methacrylate and methyl ethenyloxyacetate. In this same manner copolymers of methyl methacrylate containing 0.2, 0.5, 1.0, and 2% of the vinyl ether of methyl hydroxyacetate are prepared.

The polymers are slabbed and chopped into particles which can be conveniently used in the molding machine. The copolymers are molded in a de Mattia 1-oz. injection molding machine, using the following conditions: 210–220° C., from 23,615 to 23,685 lb./sq. in. pressure, and a 50-second molding cycle. The polymers molded unusually well, and the molded bars were colorless and possessed a brilliant luster. The copolymers possessed improved properties over unmodified methyl methacrylate polymer as regards increased softening point, decreased stiffness and improved flexural strength, as demonstrated in the table below.

| Sample | Softening temp., ° C. | Stiffness, mm. | Flexural strength |
|---|---|---|---|
| Unmodified polymethyl methacrylate control | 64 | 2.32 | 10,775 |
| Copolymer, 0.2% | 82 | 2.03 | 13,200 |
| Copolymer, 0.5% | 79 | 2.08 | 13,113 |
| Copolymer, 1% | 91 | 1.92 | 14,600 |
| Copolymer, 2% | 90 | 1.90 | 16,750 |

The values for stiffness are arbitrary values and wholly empirical. The stiffness value represents the number of millimeters that a standard impact bar 5" x ½" x ⅛" in size will sag in 5 seconds when a load of 600 g. is placed on the center of the bar.

The impact strength is measured by a standard method set up by A. S. T. M., Committee D–256–38 and described in A. S. T. M. Book of Standards Supplement, 1941, part 3, p. 339. The flexural strength is determined by a method described in "Strength of Materials," Poorman, McGraw Hill (1929), pp. 98–103, and in "Steel Construction," American Institute of Steel Construction, 1st ed. (1930), p. 71, p. 134.

When a thermoplastic material is heated, it almost invariably softens gradually, the sample changing from a rigid piece to one which is pliable. Therefore, the softening points noted are arbitrary and are determined as follows. A bar of the polymer, 2.5" x 0.5" x 0.05" in size, molded under the conditions mentioned above, is placed in an oil bath which is heated and well-stirred so that the temperature increases uniformly at the rate of 2–3° C. per minute. One end of the bar is fastened in a fixed slot, and on the other end of the bar is placed a weight of 27.5 g. The softening point is taken as that temperature at which the bar has sagged .06".

Example III

A solution of 10 parts of methyl ethenyloxyacetate in 70 parts of methylene chloride is placed in a reaction tube fitted with a sealed stirrer, a gas inlet tube, and a gas outlet tube, and the reaction tube is placed in a cooling bath maintained at −78° C. After the air has been displaced with dry nitrogen and the solution is cooled to −78° C., .09 part of anhydrous boron trifluoride gas is bubbled through the well-stirred solution. A vigorous polymerization sets in almost immediately, as evidenced by the evolution of heat. After two hours at −78° C., the boron trifluoride is destroyed by the addition of 2 parts of liquid ammonia. The reaction vessel is then removed from the cooling bath and the contents are allowed to warm to room temperature. The colorless viscous solution obtained is filtered to remove the inorganic salts, and after concentration of the polymer solution by distilling off about half the methylene chloride, the polymer is isolated by diluting the solution with diethyl ether. In this manner 10 parts of the polymeric methyl ethenyloxyacetate is obtained as a colorless, plastic, rubbery product. The sample has an intrinsic viscosity of 4.9, indicating a molecular weight in the range of 20,000 as determined by the method of H. Staudinger described in "Die Hochmolekularen Organischen Verbindungen," (Berlin 1932) p. 56.

*Example IV*

A solution of 5 parts of methyl ethenyloxyacetate in 70 parts of chloroform is placed in the reaction vessel described above and cooled to −44° C. Polymerization is effected by passing 0.3 part of anhydrous boron trifluoride through the gas inlet tube and displacing the nitrogen over the solution as it is rapidly stirred at −44° C. After 18 hours at −44° C., 2 parts of anhydrous liquid ammonia is added to destroy the boron trifluoride, and the viscous solution is allowed to warm up to room temperature. The solution is filtered from the inorganic salts, concentrated by distillation, and the polymeric methyl ethenyloxyacetate is isolated by dilution with diethyl ether. In this manner 2 parts of polymeric methyl ethenyloxyacetate is obtained. It is similar in properties to the product in Example III, and has an intrinsic viscosity of 7.6 which corresponds to a molecular weight in the range of 30,000.

*Example V*

A solution of 25 parts of methyl ethenyloxyacetate in 200 cc. of anhydrous ether is placed in the reaction vessel described in Example III and cooled to −78° C. under an atmosphere of dry nitrogen. To the well-stirred solution is slowly added 9 parts of anhydrous boron trifluoride gas. The polymerization mixture is then allowed to stand for three days at −78° C. with intermittent stirring. At the end of this time 5 parts of anhydrous liquid ammonia is added to destroy the boron trifluoride. The reaction mixture is then allowed to warm to room temperature and the polymer, which has separated during polymerization as a white solid, is filtered from the ether solution. In this manner there is obtained 22 g. of a white polymer softening at 40–50° C. when heated on a Macquenne block. The polymer has an intrinsic viscosity of 2.1 or a molecular weight in the range of 5,000–10,000.

*Example VI*

A solution comprising 1 part of the vinyl ether of methyl hydroxyacetate, 35 parts of trichloroethylene, 11 parts of isobutylene, and 33 parts of propane is placed in the reaction tube described in Example III under an atmosphere of dry nitrogen and cooled to −78° C. To the stirred, cooled solution is then added 0.9 part of anhydrous gaseous boron trifluoride in 0.3 part portions. A very vigorous polymerization occurs, as evidenced by the evolution of heat. The solution becomes very viscous, and after 3 hours, 5 parts of anhydrous liquid ammonia is added to the polymerization mixture to decompose the boron trifluoride. The cooling bath is then removed from the polymerization tube and the polymerization mixture is allowed to warm to room temperature. The copolymer is precipitated from solution by dilution with diethyl ether, and in this manner 12 parts of a colorless, plastic, rubbery copolymer is obtained. The copolymer has a carbon content of 83.46% and a hydrogen content of 13.99%, indicating that the isobutylene copolymerized with about 6% of methyl ethenyloxyacetate. The sample has an intrinsic viscosity, as determined in a 0.1% solution in Tetralin, of 4.4, which corresponds to a molecular weight of 25,000 as determined by the method referred to in Example III.

A sample of the copolymer, compounded according to the following formula:

| Ingredients | Parts |
|---|---|
| Copolymer | 20.0 |
| Carbon black | 5.0 |
| Stearic acid | 0.6 |
| Mercaptobenzothiazole | 0.1 |
| Zinc dimethyldithiocarbamate | 0.2 |
| Zinc oxide | 2.0 |
| Sulfur | 0.6 |
| Bis(p-aminophenyl)methane | 1.0 | and cured at 140° C. for 50 minutes, possesses improved snap and solvent resistance as compared to a similarly treated copolymer control compounded without bis(p-aminophenyl) methane, i. e., without crosslinking or to an isobutylene homopolymer similarly compounded with bis(p-aminophenyl) methane.

*Example VII*

A solution comprising 2.5 parts of the vinyl ether of methyl hydroxyacetate, 25 parts of propylene and 35 parts of methylene chloride is placed in a reaction vessel as described in Example III under an atmosphere of dry nitrogen and cooled to −78° C. To the well-stirred, cooled solution is added 3 parts of anhydrous boron trifluoride. The mixture is then maintained at −78° C. for 72 hours. At the end of this time, 5 parts of anhydrous liquid ammonia is added to the system to destroy the boron trifluoride, and the mixture is allowed to warm to room temperature. The solvent is removed from the filtered solution by evaporation at 100° C. at 1 mm. pressure. In this manner 13 parts of a light tan-colored viscous liquid is obtained which has a saponification equivalent of 504. This indicates that the propylene copolymerized with about 21% of the vinyl ether of methyl hydroxyacetate.

*Example VIII*

A solution comprising 1 part of the vinyl ether of methyl hydroxyacetate, 15 parts of isobutyl vinyl ether and 70 parts of methylene chloride is placed in a reaction tube as described in Example III under an atmosphere of dry nitrogen and cooled to −78° C. Polymerization is induced by adding 0.3 part of anhydrous boron trifluoride to the well-stirred solution. After an induction period of about ten minutes, rapid polymerization occurs as evidenced by the evolution of heat. The solution is then allowed to stand at −78° C. for 16 hours. At the end of this time the boron trifluoride is decomposed by the addition of 2 parts of anhydrous liquid ammonia, and the solution is allowed to warm to room temperature. The solvent is removed from the filtered solution by evaporation at 100° C. at 1 mm. mercury pressure. In this manner 10 g. of a viscous copolymer is obtained which has a saponification equivalent of 456. This indicates that the isobutyl vinyl ether copolymerized with about 25% of the vinyl ether of methyl hydroxyacetate.

By treating solutions of isobutyl vinyl ether containing 12.5, 23.5, and 55% of the vinyl ether of methyl hydroxyacetate in the same manner as described in this example, copolymers were obtained corresponding to the copolymerization of 32, 39, and 81% of the vinyl ether of methyl hydroxyacetate as determined by saponification equivalents. The copolymers were clear, colorless, viscous liquids soluble in ether, acetone, ethyl acetate, ethyl alcohol, and toluene but insoluble in aliphatic hydrocarbons and water.

The invention is illustrated above in the polymerization, including copolymerization, of methyl ethenyloxyacetate but is generic to the polymerization of ethenyloxyacetic acid esters preferably of monohydric alcohols of up to seven carbon atoms including the ethyl, propyl, butyl, cyclohexyl, benzyl, tetrahydrofurfuryl, ethoxyethyl, allyl, and methallyl esters. The monomeric monohydric alcohol esters may be prepared by pyrolysis of the corresponding ester of ethylidene-bisoxyacetic acid. Polyhydric alcohol esters may be prepared from the monohydric alcohol esters by ester interchange, e. g., with a litharge catalyst. The pyrolysis is conducted by the method employed in U. S. Patent No. 1,931,858 for dialkyl-acetals using the precious metal catalysts described therein.

The temperature of the catalyst bed during pyrolysis may be any temperature between 150 and 450° C., but preferably in the range of 250–350° C. If a preheater is used, it is best to operate the preheater at temperatures from 100 to 250° C., but preferably about 200° C. It has been found best to maintain a flow of an inert gas such as nitrogen, carbon dioxide, methane, and other similar inert gases through the pyrolysis chamber so that the products of pyrolysis may be rapidly removed from the converter chamber. Preferably gas flows are those which give times of contact between 5 and 13 seconds.

The ethenyloxyacetic acid esters may be polymerized by a variety of techniques.

They may be polymerized in solution, preferably at low temperature, either alone or together with another polymerizable ethylenically unsaturated compound of not more than sixteen carbon atoms and having a methylene ($CH_2$) group attached by an ethylenic double bond to the remainder of the molecule using as catalyst a Friedel-Crafts' halide catalyst (Chemical Reviews, 17, 372 (1935) Catalyst Table 2). These catalysts include boron trifluoride, stannic chloride, aluminum chloride, aluminum bromide, zinc chloride, ferric chloride, antimony pentachloride, antimony trichloride, titanium trichloride, titanium tetrachloride, zirconium tetrachloride, and mercuric chloride with aluminum metal. Operation in solution is advantageous in that the heat of polymerization is more rapidly dissipated, thus leading to polymers of higher molecular weight. The preferable range of solution is 10–40% of the monomer in solvents such as diethyl ether, dipropyl ether, diisobutyl ether, methyl formate, ethyl formate, ethyl acetate, methyl chloride, ethyl bromide, methylene chloride, trichloroethylene, n-propyl bromide, butyl chloride, and chloroform. The halogenated hydrocarbon solvents of one to four carbons are particularly preferred since they are good solvents both for the monomer and the polymers at the low temperatures at which it is especially beneficial to work. Although the ethenyloxyacetic acid esters may be converted to polymeric products by employing Friedel-Crafts' halide-catalyzed systems at any temperature, it has been found preferable to prepare the polymers at temperatures below 0° C., preferably below −44° C. The products obtained by operating at lower temperatures have higher molecular weights as indicated by physical properties and viscosity measurements. Thus, polymerization at −100° C. gives polymers of higher molecular weight than can be obtained at −44° C. The Friedel-Crafts' catalyst is preferably employed in concentrations of 1 to 5% although higher or lower concentrations may be used. Higher concentrations are desirable when ether, alcohol or esters are used as a solvent for polymerization, since oxygenated compounds form complexes with the catalyst thus reducing its activity.

While any ethylenically unsaturated organic compound of up to sixteen carbon atoms having a methylene group attached by an ethylenic double bond to the remainder of the molecule may be employed for copolymerization with, preferably, low proportions, i. e., up to 15%, of ethenyloxyacetic acid esters with the low temperature-Friedel-Crafts' catalyst method, the following are preferred (a) polymerizable olefin hydrocarbons of molecular weight above 30 (since ethylene gives a waxy polymer) e. g., propylene, butylene-1, butylene-2, isobutylene and amylene; and (b) vinyl alkyl ethers, e. g., methyl vinyl ether, ethyl vinyl ether, butyl vinyl ether, isobutyl vinyl ether, and amyl vinyl ether; but any vinyl or vinylidene compound polymerizable with the aid of boron trifluoride may be employed.

The ethenyloxyacetic acid esters may also be polymerized by the granulation technique. In this method, which is preferred among the peroxide-catalyzed systems, the unsaturated materials to be polymerized or copolymerized are rapidly stirred and heated in an aqueous system containing a buffering agent, a catalyst, and a granulating agent, such as the sodium salt of polymethacrylic acid. It is characteristic of this system that the polymer does not ordinarily take the form of an emulsion but rather is formed into small granules the major portion of which settle out when agitation is stopped. This fact is of considerable importance in that isolation of the copolymer is accomplished more easily, and the copolymer is easier to filter and wash. Whereas the sodium salt of polymethacrylic acid has been indicated in Example II, a large number of granulating agents, such as partially hydrolyzed polyvinyl acetate, methyl starch, pectin, and agar-agar, is suitable. In place of the sodium hydrogen phosphate used to control the pH of the solution, a wide variety of buffering agents such as citrates, acetates, and other phosphates is suitable.

In granulation polymerization it is convenient to utilize organic peroxides such as benzoyl peroxide, lauroyl peroxide, succinoyl peroxide, and ascaridole. Also suitable are inorganic peroxides such as hydrogen peroxide. The amount of catalyst affects the properties of the copolymer and is chosen with this and the desired speed of reaction in mind. Increased catalyst concentration speeds up polymer formation but results in lower molecular weight polymer. Although the amount of catalyst such as benzoyl peroxide can be varied from 0.1 to 5%, concentrations in the range of 1–2% are preferable. It is most convenient to carry out the copolymerizations at reflux temperatures, but lower reaction temperatures which necessitate longer reaction times, or higher reaction temperatures which involve the use of pressure equipment, are quite feasible and in some instances desirable.

Another aqueous dispersion technique is that of emulsion polymerization. In this the mixture of monomers is dispersed or emulsified in an aqueous system containing a catalyst and a dispersant and is then polymerized by heating and agitating. The polymer is obtained either in the form of a latex or a coagulum. If the latex is produced, it is coagulated by means of an aqueous aluminum sulfate solution, filtered, and washed thoroughly to remove the dispersing agent. In the practice of this technique a large variety of commercially available dispersing agents is operable. Among these are salts of fatty acids, long chain sulfonates and sulfates, such as sodium oleylsulfate, sodium cetylsulfate, sodium acetoxyoctadecylsulfate, sodium pentadecane-8-sulfate, sodium triisopropylnaphthalenesulfonate, and the sodium salt of sulfonated paraffin oil prepared as described in patent application Serial No. 352,797, filed August 15, 1940. Also suitable are quaternary ammonium salts and betaines of long chain hydrocarbons such as stearyltrimethylammonium bromide and hydroxypropyl-C-cetyl betaine. Although ammonium persulfate is the preferred catalyst for emulsion polymerization, other persulfates such as potassium persulfate and sodium persulfate, peroxides such as benzoyl peroxide, hydrogen peroxide, and succinoyl peroxide, and various per salts such as perborates are suitable. While the emulsion copolymerization can be carried out using temperatures from room temperature to 90° C., it is generally more convenient to use temperatures in the range of 40–65° C. The ethenyloxyacetic acid esters may be polymerized by this technique with the terminal methylene ethylenically unsaturated compounds indicated above in connection with the granulation technique. The ethenyloxyacetic acid esters do not in general polymerize alone by either the granulation or emulsion technique. Copolymerization may also be effected under the influence of heat or actinic light in the presence of organic peroxide catalysts by employing bulk methods in which no solvent is used. In case heat is employed, the temperatures can range from 30 to 200° C., preferably 75–150° C., and the organic peroxides mentioned above are suitable in concentrations of 0.1 to 5% but preferably at 0.5 to 2% concentration. Homopolymerization in bulk, i. e., polymerization in bulk of the ethenyloxyacetic acid ester without any additional polymerizable material but with a peroxide catalyst leads only to low polymers which are less desirable.

Wile peroxide-catalyzed copolymerization by granulation, emulsion, or bulk technique may be carried out with any poylmerizable ethylenically unsaturated compound of up to sixteen carbon atoms having a methylene (CH2) group attached by an ethylenic double bond to the remainder of the molecule including vinyl hydrocarbons, e. g., styrene and vinylnaphthalene; vinyl esters of organic acids, e. g., vinyl acetate and vinyl isobutyrate; vinyl esters of inorganic acids, e. g., vinyl halides such as vinyl chloride; vinyl ketones, e. g., methyl vinyl ketone; and methyl isopropenyl ketone and other polymerizable vinylidene compounds, e. g., vinylidene chloride, copolymerizations using peroxide catalysts are preferably carried out with acrylic type polymerizable monomers, i. e., compounds containing the vinyl or vinylidene radical bonded to a carboxy group or a functional derivative thereof which on hydrolysis gives the carboxy group, e. g., acrylic, methacrylic, alpha-phenylacrylic and alpha-chloroacrylic acids, esters, nitriles, e. g., benzyl phenylacrylate, methyl alpha-chloroacrylate and the methyl, ethyl, propyl, butyl, isobutyl, dodecyl, cyclohexyl, allyl, benzyl, and 2-acetoxyethyl acrylates and methacrylates. In copolymerizations involving this group from the class of compounds having the formula

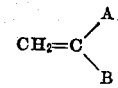

where A is hydrogen, halogen or hydrocarbon of one to six carbons and B is halogen, alkyl of one to four carbons, or a group having a carbon atom not more than one atom removed from the

carbon and attached by a plural bond to a negative inorganic polyvalent element of the first full period of the periodic table, a low proportion of ethenyloxyacetic acid esters, i. e., up to 10%, is ordinarily employed for optimum results.

The unmodified polymeric ethenyloxyacetic acid esters are useful as bonding agents, pressure adhesives, electric cable insulations, and fabric coatings. The polycarboxylic acids derived on hydrolysis of the polymeric esters with aqueous or alcoholic alkali are useful as tanning agents and textile sizes. The amides derived from the polymeric esters with ammonia or primary mono- or diamines can be used as wax substitutes or in waterproofing fabrics, and can be cross-linked or insolubilized by reaction with aldehydes, e. g., formaldehyde, acetaldehyde, butyraldehyde, furfuraldehyde, and benzaldehyde. Interpolymers of isobutylene with ethenyloxyacetic acid esters are useful in cable insulations, as lubricating oil adjuvants, self-sealing fuel cell innerliners, adhesives, and synthetic rubber compositions which can be cured by heating with a primary diamine as in Example VI.

The copolymers of the ethenyloxyacetic acid esters with methacrylic acid esters and other polymerizable vinyl and vinylidene compounds are useful in the production of a considerable variety of molded products, such as combs, dentures, lenses, jewelry, electrical equipment, automobile accessories, and drafting instruments.

The above description and examples are intended to be illustrative only. Any modification of or variation therefrom which conforms to the spirit of the invention is intended to be included within the scope of the claims.

This application is a division of my copending application Serial No. 468,811, filed December 12, 1942.

What is claimed is:

1. A copolymer of an ethenyloxyacetic acid ester with a polymerizable olefin hydrocarbon of not more than five carbon atoms and of molecular weight above 30 which has a methylene group attached by an ethylenic double bond to the remainder of the molecule.

2. A copolymer of an ethenyloxyacetic acid ester of a monohydric alcohol of one to seven carbon atoms with a polymerizable olefin hydrocarbon of not more than five carbon atoms and of molecular weight above 30 having a methylene group attached by an ethylenic double bond to the remainder of the molecule.

3. A copolymer of propylene with an ethenyloxyacetic acid ester.

4. A copolymer of isobutylene with an ethenyloxyacetic acid ester.

5. A copolymer of isobutylene with an ethenyloxyacetic acid ester of a monohydric alcohol of one to seven carbon atoms.

6. A copolymer of isobutylene with methyl ethenyloxyacetate.

7. A copolymer of isobutylene with up to 15% of methyl ethenyloxyacetate.

8. Process for preparing polymers which comprises bringing an ethenyloxyacetic acid ester in contact with a Friedel-Crafts' catalyst in solution in an inert liquid solvent for monomer, polymer and catalyst.

9. Process of claim 8 wherein the polymerization is conducted at a temperature below 0° C.

10. Process of claim 8 wherein the polymerization is conducted at a temperature below −44° C.

11. Process of claim 8 wherein the catalyst is boron trifluoride and the polymerization is carried out at a temperature of up to −44° C.

12. Process for preparing polymers which comprises bringing an ethenyloxyacetic acid ester of a monohydric alcohol of one to seven carbon atoms in contact with a Friedel-Crafts' catalyst in solution in an inert liquid solvent for monomer, polymer and catalyst.

13. Process of claim 12 wherein the polymerization is conducted at a temperature below 0° C.

14. Process of claim 12 wherein the polymerization is conducted at a temperature below −44° C.

15. Process of claim 12 wherein the catalyst is boron trifluoride and the polymerization is carried out at a temperature of up to −44° C.

DONALD DRAKE COFFMAN.